(12) United States Patent
Zaugg et al.

(10) Patent No.: US 9,778,619 B2
(45) Date of Patent: Oct. 3, 2017

(54) MAGNETIC OR ELECTROSTATIC PIVOTING OF A MOBILE TIMEPIECE ELEMENT

(71) Applicant: MONTRES BREGUET SA, L'Abbaye (CH)

(72) Inventors: Alain Zaugg, Le Sentier (CH); Sylvain Dauby, Genolier (CH); Benoit Junod, Les Rousses (FR); Davide Sarchi, Renens (CH)

(73) Assignee: Montres Breguet SA, L'Abbaye (CH)

( * ) Notice: Subject to any disclaimer, the term of this patent is extended or adjusted under 35 U.S.C. 154(b) by 0 days.

(21) Appl. No.: 14/764,041

(22) PCT Filed: Dec. 10, 2013

(86) PCT No.: PCT/EP2013/076073
§ 371 (c)(1),
(2) Date: Jul. 28, 2015

(87) PCT Pub. No.: WO2014/117891
PCT Pub. Date: Aug. 7, 2014

(65) Prior Publication Data
US 2015/0362892 A1     Dec. 17, 2015

(30) Foreign Application Priority Data

Feb. 4, 2013  (EP) ..................................... 13153885

(51) Int. Cl.
*G04C 5/00*     (2006.01)
*G04B 1/16*     (2006.01)
(Continued)

(52) U.S. Cl.
CPC ............ *G04B 1/16* (2013.01); *F16C 32/0431* (2013.01); *G04B 17/285* (2013.01); *G04C 3/064* (2013.01); *G04C 5/005* (2013.01); *F16C 2370/00* (2013.01)

(58) Field of Classification Search
CPC . G04C 3/00; G04C 3/06; G04C 3/064; G04C 5/005; G04B 1/16; G04B 17/285; F16C 32/0431; F16C 2370/00
See application file for complete search history.

(56) References Cited

U.S. PATENT DOCUMENTS

| 3,010,037 A | 11/1961 | Van Horn et al. |
| 3,605,401 A * | 9/1971 | Reich .................. G04C 3/0276 310/36 |

(Continued)

FOREIGN PATENT DOCUMENTS

| DE | 1205915 B | 11/1965 |
| DE | 2136371 A1 | 2/1973 |

(Continued)

OTHER PUBLICATIONS

International Search Report issued Aug. 12, 2014 in PCT/EP2013/076073 filed Dec. 10, 2013.

*Primary Examiner* — Sean Kayes
(74) *Attorney, Agent, or Firm* — Oblon, McClelland, Maier & Neustadt, L.L.P.

(57) ABSTRACT

A timepiece sub-assembly including a mobile timepiece element including first and second annular and opposite peripheral surfaces of revolution about a same pivot axis, and a device for guiding pivoting about a theoretical axis of a timepiece mechanism. The first surface is magnetically or electrically charged, and the device includes at least three first surfaces regularly arranged around the theoretical axis, oppositely magnetically or respectively electrically charged to the first surface to repulse it at a first interface. In a watch, (Continued)

the second surface is magnetically or electrically charged, and the device includes at least three second surfaces regularly arranged around the theoretical axis, oppositely magnetically or electrically charged to the second surface to repulse it at a second interface.

23 Claims, 5 Drawing Sheets

(51) Int. Cl.
  *G04C 3/06* (2006.01)
  *G04B 17/28* (2006.01)
  *F16C 32/04* (2006.01)

(56) References Cited

U.S. PATENT DOCUMENTS

| | | | | |
|---|---|---|---|---|
| 3,678,681 | A * | 7/1972 | Saito | G04C 3/06 318/127 |
| 5,109,659 | A * | 5/1992 | Tsuzuki | D01H 7/56 57/122 |
| 5,506,459 | A * | 4/1996 | Ritts | A63H 1/00 310/90.5 |
| 6,153,958 | A * | 11/2000 | Hull | F16C 32/0438 310/90 |
| 6,231,011 | B1 * | 5/2001 | Chu | B64G 1/283 244/165 |
| 2003/0137901 | A1 | 7/2003 | Tokoro et al. | |
| 2004/0261649 | A1 * | 12/2004 | Guardo, Jr. | B60L 13/10 104/284 |
| 2007/0201317 | A1 * | 8/2007 | Houlon | G04C 5/005 368/281 |
| 2012/0112589 | A1 * | 5/2012 | Marechal | F16C 32/0408 310/90.5 |

FOREIGN PATENT DOCUMENTS

| | | |
|---|---|---|
| DE | 10062065 A1 | 3/2002 |
| FR | 1276204 A | 11/1961 |
| WO | 2006/022554 A1 | 3/2006 |

* cited by examiner

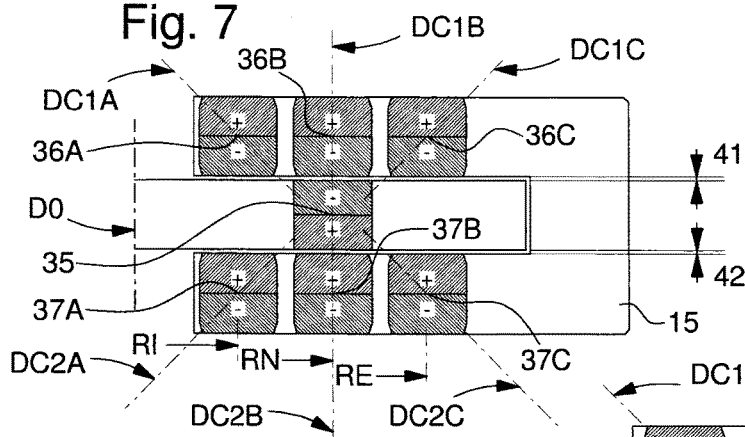
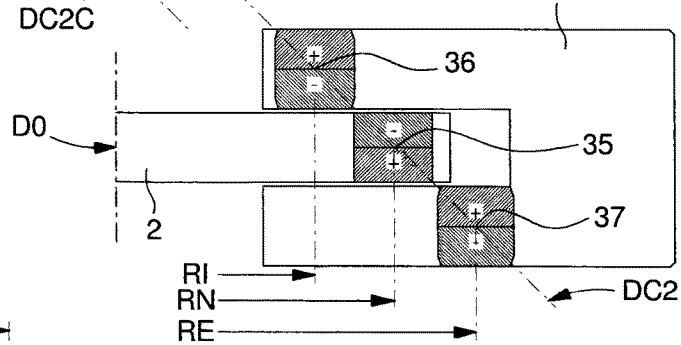
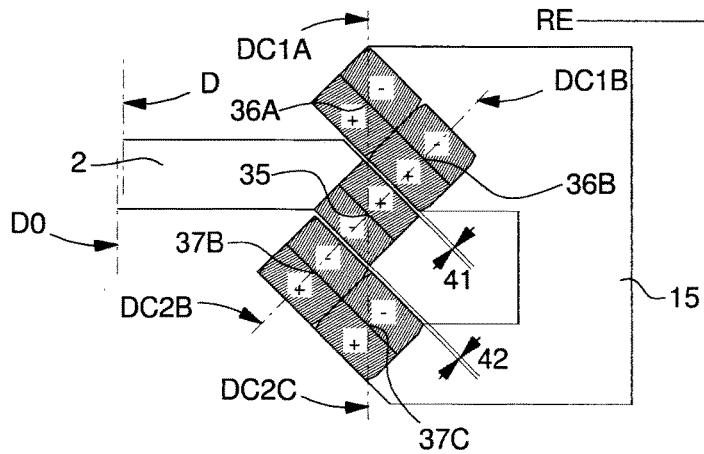
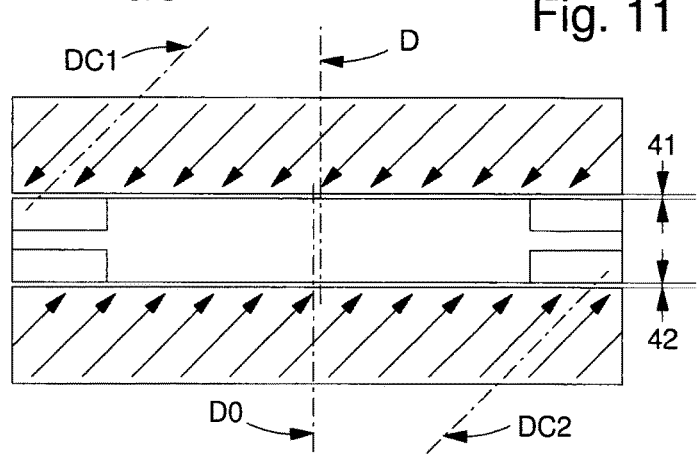

MAGNETIC OR ELECTROSTATIC PIVOTING OF A MOBILE TIMEPIECE ELEMENT

CROSS-REFERENCE TO RELATED APPLICATIONS

This is a National Phase Application in the United States of International Patent Application PCT/EP 2013/076073 filed Dec. 10, 2013, which claims priority on European Patent Application No. 13153885.2 of Feb. 4, 2013. The entire disclosures of the above patent applications are hereby incorporated by reference.

FIELD OF THE INVENTION

The invention concerns a timepiece sub-assembly including, on the one hand, a mobile timepiece element with at least a first annular peripheral surface of revolution about a pivot axis of said mobile element, and on the other hand, a device for guiding pivoting about a theoretical axis of a timepiece mechanism. The invention also concerns a timepiece movement including at least one such timepiece sub-assembly.

The invention also concerns a watch including at least one such timepiece movement and/or including at least one such timepiece sub-assembly.

The invention also concerns a clock including at least one such timepiece movement and/or including at least one such timepiece sub-assembly.

The invention concerns the field of guiding the pivoting of mobile timepiece elements, and more particularly the guiding of tourbillon or karussel carriages.

BACKGROUND OF THE INVENTION

Conventionally, mobile timepiece elements, and particularly tourbillon or karussel carriages are pivoted between two jewels carried by the main plate of the timepiece movement.

In particular embodiments, the tourbillon and karussel carriages can be pivoted on a ball bearing. This manner of manufacturing a flying tourbillon makes it possible to significantly reduce the thickness of the tourbillon carriage, and consequently, the thickness of the movement. However, the friction in such a ball bearing is variable, strongly proportional to drive torque.

There is also known a tourbillon carriage pivoted on three external bearings, which may be ball bearings. This embodiment is advantageous for reasons of size and weight carried by the carriage. Problems of friction are similar to the version arranged on a ball bearing, these ball bearings are smaller, but rotate more quickly and there are three of them.

DE Patent Application No 2136371A1 in the name of BRAUN discloses a magnetic bearing including an arrangement of magnets between a case and an arbor in order to hold the arbor radially and axially. The magnets carried by the arbor and the case may have an axial or radial or even oblique field.

DE Patent No 1205915B in the name of JUNGHANS discloses magnetic guiding of a balance, with a magnetically charged disc integral with the balance, or formed by the balance rim, which is rotatably movable in an air gap between the magnetic rings axially disposed on either side of the balance disc.

FR Patent No 1276204A in the name of JUNGHANS discloses a magnetic ring moving freely around a balance staff, to compensate for differences of friction in the pivots according to the position of a watch. In a variant, an axial thrust force is transmitted to a pivot through magnetic repulsion.

SUMMARY OF THE INVENTION

The invention proposes pivoting means for a mobile timepiece element, notably of a tourbillon or karussel carriage, the pivoting means being located at the periphery of the mobile element or of the carriage, in proximity to the outer diameter, with a device in which friction is reduced, or removed, and wherein the the use of ball bearings is unnecessary.

To this end, for an application to a static timepiece or clock, the invention concerns a timepiece sub-assembly including, on the one hand, a mobile timepiece element with at least a first annular peripheral surface of revolution about a pivot axis of said mobile element, and on the other hand, a device for guiding pivoting about a theoretical axis of a timepiece mechanism, characterized in that said first peripheral surface is magnetically or electrically charged, and in that said device includes, either a first magnetically or respectively electrically charged ring, or at least three first magnetically or respectively electrically charged surfaces, positioned opposite to said first peripheral surface so as to repulse on a first interface, said first surfaces being disposed in a regular manner abut said theoretical axis, to maintain said mobile element in magnetic levitation.

According to a feature of the invention, for the application thereof to a watch, said one mobile timepiece element includes said first and a second annular peripheral surfaces of revolution about the same pivot axis of said mobile element and opposite to each other on either side of said mobile element, and said second peripheral surface is magnetically or electrically charged, and said device includes, either a second magnetically or respectively electrically charged ring, or at least three second magnetically or respectively electrically charged surfaces, positioned opposite to said second peripheral surface so as to repulse it, at a second interface, said second surfaces being regularly arranged around said theoretical axis.

The invention also concerns a timepiece movement including at least one such timepiece sub-assembly, characterized in that the movement includes magnetic and/or electrostatic field insulating or shielding means around said mobile element and said pivoting guide device.

The invention also concerns a watch including at least one timepiece movement and/or including at least one such timepiece sub-assembly, characterized in that the watch includes magnetic and/or electrostatic field insulating or shielding means around said mobile element and said pivoting guide device.

The invention also concerns a clock including at least one such timepiece movement and/or including at least one such timepiece sub-assembly, characterized in that the clock includes magnetic and/or electrostatic field insulating or shielding around said mobile element and said pivoting guide device.

BRIEF DESCRIPTION OF THE DRAWINGS

Other features and advantages of the invention will appear upon reading the following detailed description, with reference to the annexed drawings, in which:

FIG. 7 shows in a cross-section similar to that of FIG. 3, a very efficient self-centring version, with three concentric rows of fixed pole shoes, wherein the median row faces the magnetically charged rings of the mobile element, the end rows developing a higher magnetic field than that on the median path;

FIG. 9 illustrates a cross-section of a variant, wherein the pole shoes above and below the mobile element are on respectively smaller and greater radii than that of the magnetically charged ring of the mobile element.

FIG. 10 illustrates a cross-section of a variant, wherein the ring of the mobile element is tilted at approximately 30° and wherein the opposing fixed pole shoes are also tilted, these pole shoes above and below the mobile element are, in projection on a cone at same tilt, on radii respectively smaller and greater than that of the magnetically charged ring of the mobile element.

FIG. 11 illustrates a cross-section of another variant, wherein the fields above and below the mobile element are developed in cylindrical surfaces opposite the magnetically charged ring of the mobile element.

DETAILED DESCRIPTION OF PREFERRED EMBODIMENTS

Figure 1:
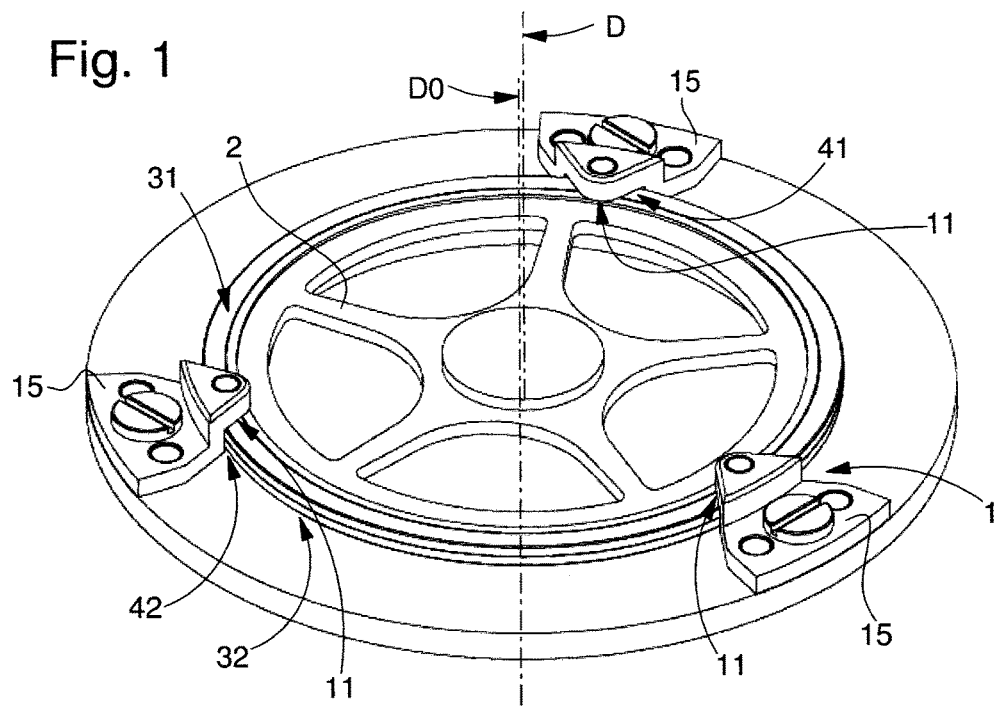
FIG. 1 shows a schematic perspective view of a mobile timepiece element according to the invention, in the par

The invention further concerns a timepiece sub-assembly 10 for a movement 100. This sub-assembly 10 includes, on the one hand, a mobile timepiece element 2 with at least one peripheral surface 3, in the presence case a first annular peripheral surface 31 of revolution about a pivot axis D of mobile element 2, and on the other hand, a device 1 for guiding pivoting about a virtual axis, that will be referred to here as theoretical axis D0 of a timepiece mechanism.

This device 1 is, in general, connected to a main plate or a bridge or bar of movement 100 of the timepiece, such as a watch 200 or clock 300. The invention can, however, be used with device 1 mounted integrally with a mobile component, wheel, oscillating weight, lever or other element.

According to the invention, the first peripheral surface 31 is uniformly magnetically or electrically charged axially in the radial coordinate, and preferably uniformly in the angular coordinate.

This means that the resulting magnetic and/or electrostatic field, depending on the case, is directed in an "axial" direction, i.e. parallel to theoretical axis D0. This field has the same value for every angular position in a plane perpendicular to theoretical axis D0. It will be noted, in this regard, that the first annular peripheral surface 31 of revolution is preferably plane, perpendicular to pivot axis D, whose function is to be aligned in operation with theoretical axis D0.

Device 1 includes, either a first, preferably uniformly magnetically or respectively electrically charged ring, or at least three first magnetically, or respectively electrically charged surfaces 11, positioned opposite to the first peripheral surface 31 so as to repulse it at a first interface 41. These first surfaces 11 are preferably regularly arranged around theoretical axis D0, to hold mobile element 2 in axial levitation in direction D0. In an embodiment illustrated by the Figures, these first surfaces 11 are arranged in an equilateral triangle centred on axis D0. Naturally, they may be more numerous, in an irregular, or preferably regular polygon, or together form a single continuous surface of a ring or similar.

In a particular embodiment, these first surfaces 11 are coplanar.

In a particular embodiment, these first surfaces 11 are identical to each other, and generate an identical magnetic, or respectively electrostatic field.

If the first ring or the at least three first surfaces 11 are magnetically or electrically charged, preferably in a uniform manner, other embodiments, called "opportunely non-uniform" embodiments, are possible, for example with fields of particular intensity or direction, having cyclical, particularly periodic, features.

Figure 6:
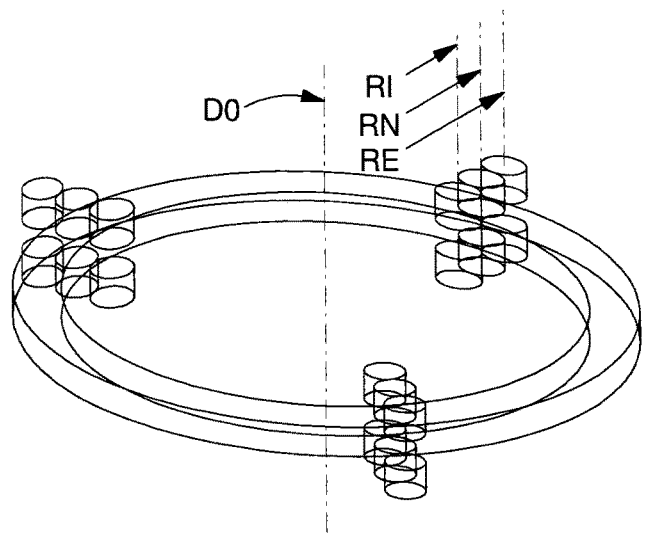
FIG. 6 shows in perspective.

It is often simpler to work with uniform components, and to combine them in an opportune manner to impose a minimum field level at the place where first peripheral surface 31 is required to be positioned, as will be seen below in a particular embodiment illustrated, in particular, by FIG. 6, with three groups of six magnets at 120°: three upper and three lower magnets.

However, it is also possible, although more complex to accomplish, to obtain sufficient magnetisation or respectively electrical charge precision to integrate radial modulation of the field in a single component: this is what is referred to here as a single "opportunely non-uniformly" magnetically, or respectively electrically charged surface.

Figure 13:
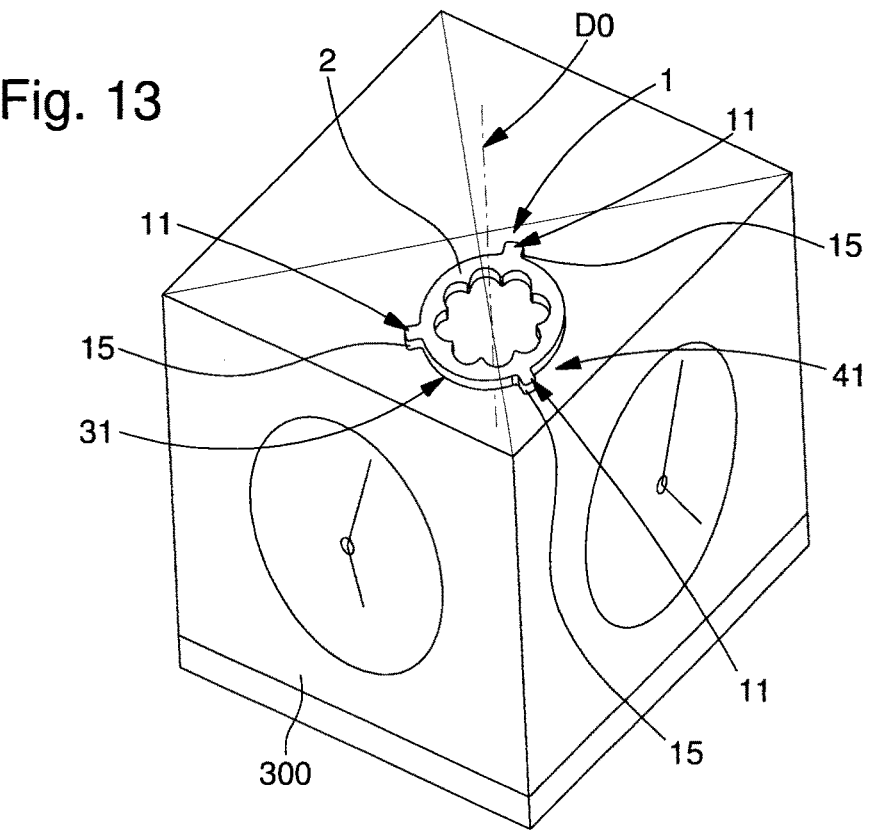
FIG. 13 shows a schematic perspective view of a clock equipped with an assembly according to the invention with a mobile element in levitation on only one of its faces.

The application of the invention, in this elementary form, to a static timepiece such as a clock 300 seen in FIG. 13 wherein first surfaces 11 are situated underneath mobile element 2, enables mobile element 2 to be maintained in levitation. In a static application, few shocks need be feared (naturally mobile element 2 must be immobilised during transport by a clamp or similar) and, for acceleration values of less than 10 g, centring can be ensured by a radial holding means, formed by a set of stop members, or runners, or cylindrical jewels, or springs, or similar, without substantially degrading the gain, in terms of friction, of the solution proposed by the invention. Preferably, the elements forming this radial holding means are positioned in radial correspondence with first surfaces 11. Losses due to friction are only in the radial direction, and there is much less friction than there would be with a pivot, when axis D0 is vertical.

In a static application, a magnetic or electrostatic field can be generated by external means: in particular at least one electromagnet can create magnetic fields on first surfaces 11 with no other limitation of field intensity than that of disturbance by other elements of the movement. This limitation can be avoided by using magnetic and/or electrostatic field insulating or shielding means around mobile element 2 and pivoting guide device 1, or by using weakly paramagnetic materials such as aluminium, gold, brass or suchlike (magnetic permeability of less than 2) in the magnetic variant, or low dielectric materials in the electrostatic variant (dielectric constant of between 1 and 50 and dielectric rigidity of more than 10 MV/m).

The application of the invention to a watch 200 requires mobile element 2 to be maintained in all spatial positions and a capacity to absorb shocks with no significant disturbance, and an architecture ensuring, in addition to the levitation of mobile element 2, the permanent centring or re-centring of its pivot axis D on theoretical axis D0 of pivoting guide device 1.

Figure 3:
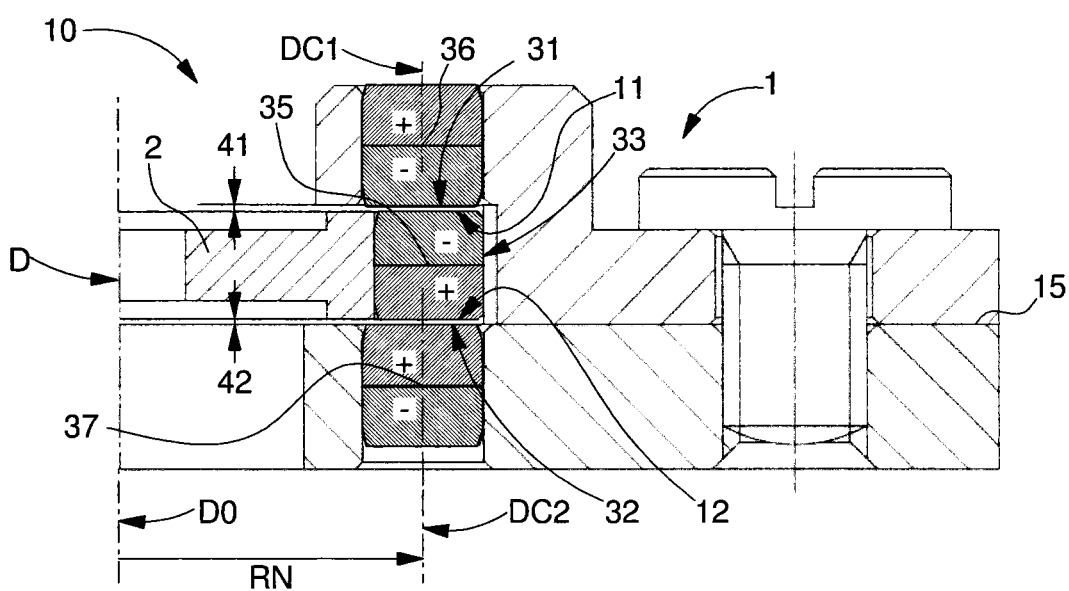
FIG. 3 shows a schematic view along the cross-section AA of FIG. 2, of the same assembly, in a particular embodiment with magnetically charged rings above and below the mobile timepiece element in the peripheral area thereof, and a pivoting guide device with magnetically charged pole shoes arranged facing these magnetically charged rings in order to repulse them.

To this end, as seen in particular in FIG. 3, mobile timepiece element 2 includes a first 31 and a second 32 annular peripheral surfaces of revolution 3 about the same pivot axis D of mobile element 2, and opposite to each other on either side of mobile element 2. There is therefore added a second surface 32 which has the same function as first surface 31, but is oppositely charged thereto. Depending on the geometry of mobile element 2, these two surfaces 31 and 32 are on either side of mobile element 2 as a whole, or of a flange or a collar comprised therein, or other. Preferably, but not necessarily, these annular surfaces 31 and 32 have an identical mean radius RN.

The second peripheral surface 32 is magnetically or electrically charged, preferably in a uniform manner in the angular coordinate.

If the second ring or the at least three second surfaces 12 are magnetically or electrically charged, preferably in a uniform manner, other "opportunely non-uniform" embodiments are possible, for example with fields of particular intensity or direction, having cyclical, particularly periodic features and/or having a non-monotonous gradient of magnetization in the radial coordinate concerned from theoretical axis D0, generating, for example, a lower magnetic field in correspondence with a radial crown, delimited between a minimum radius Rm and a maximum radius RM, where Rm<RM, this non-uniformity enhancing the centring of the levitated mobile element 2.

The Figures show the various useful surfaces 31, 32, 33 of the mobile element, carried by pole shoes, respectively 35 or 35A and 35B for surfaces 31 and 32 and 38 for an edge surface 33. This arrangement is a particular variant of the invention, which is not limiting, in fact, mobile element 2 may be directly magnetically or electrically charged on certain of its surfaces.

In a similar manner, the Figures illustrate a carrier structure 15 of device 1, which carries pole shoes: upper pole shoe 36 for first surface 11, lower pole shoe 37 for second surface 12, tangential pole shoe 39 carrying a third surface 13 for cooperating with a third edge surface 33. These embodiments are not limiting. A convenient embodiment consists in using electrically charged magnets and/or bars to form these pole shoes. Naturally, the surfaces of carrier structure 15 may also be directly magnetically or electrically charged.

According to the invention, like first surface 31, second peripheral surface 32 is magnetically or electrically charged. Device 1 includes either a second magnetically or respectively electrically charged ring, or at least three second magnetically or respectively electrically charged surfaces 12, positioned opposite to second peripheral surface 32 in order to repulse it at a second interface 42, second surfaces 12 preferably being regularly arranged around theoretical axis D0, in a similar manner to the arrangement of first surfaces 11.

This regular arrangement is especially useful for mechanisms in which good radial retention and good centring are required.

Naturally, the different variants which will be described below, for a version with first 31 and second 32 opposite peripheral surfaces, can also be applied to the version of FIG. 13, and in particular the variants relating to centring.

As in the variant described above wherein mobile element 2 has a single first peripheral surface 31, all or part of the centring can be ensured by a radial holding means similar to those described above. However, some variants described here can ensure the actual centring function through a particular arrangement of the magnetic and/or electrostatic fields present. The radial holding means essentially serves as a end-of-travel safety stop, and can be adjusted with play so that there is no contact in normal operation between mobile element 2 and the components of this radial holding means. This radial holding means, formed in particular by mechanical stop members, is advantageously coated with materials used to absorb the energy from the shock, for example diamagnetic materials (negative magnetic susceptibility of less than or equal to $-10^{-5}$).

In a particular embodiment, the first surfaces 11 are grouped together on a first ring along theoretical axis D0 and/or second surfaces 12 are grouped together on a second ring along theoretical axis D0.

Figure 4:
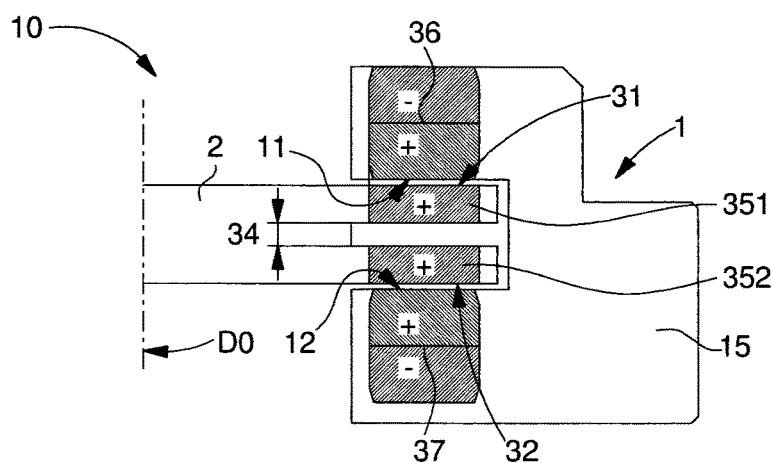
FIG. 4 illustrates a variant of FIG. 3, the mobile element including rings of the same polarity separated by a groove.

Different variant embodiments are possible, notably:
- the first peripheral surface 31 is separated from the second peripheral surface 32, either by a low dielectric (dielectric constant of between 1 and 50 and dielectric rigidity of more than 10 MV/m) in a median groove 34 of mobile element 2, as seen in FIG. 4. This groove 34 includes, between the areas 351 and 352 of mobile element 2, a medium which is, depending on the case, either weakly paramagnetic (magnetic permeability of less than 2) or dielectric, then having a dielectric constant (dielectric constant of between 1 and 50 and dielectric rigidity of more than 10 MV/m). It is also possible to use a diamagnetic (negative magnetic susceptibility of less than or equal to $-10^{-5}$) such as graphite or graphene.
- as seen in FIG. 3, first peripheral surface 31 is adjacent to second peripheral surface 32 and they have magnetic or electric charges of opposite polarity.

The essential point is not to create unbalance in the intensities of the magnetic and/or electrostatic fields to which mobile element 2 is subjected, particularly the component parallel to theoretical axis D0 which determines the levitation.

The sizing of mobile element 2 and the fields is naturally difficult. In general, the levitation of a mobile element 2, such as a carriage, having a weight of less than 1 gramme, particularly close to 0.2 g, subjected to a torque of 1 g·mm, is possible, but requires considerable sizing and prototype work (several months if optimised manufacture of the magnetic or electrostatic components used is accomplished quickly).

An example embodiment implements axially magnetized neodymium-iron-boron magnets with a remanent field of 1.4 T, a radius of 0.25 mm and height of 0.5 mm. Mobile element 2 is an axially magnetized magnetic crown with a remanent field of 1 T, diameters of 6.02 mm and 5.62 mm and a height of 0.45 mm. The width of interfaces 41 and 42 is selected to be equal to 0.025 mm. These values ensure the levitation, multiplying the number of pole shoes permits proper adaptation to the weight of the mobile element and to the torque applied thereto.

Figure 5:
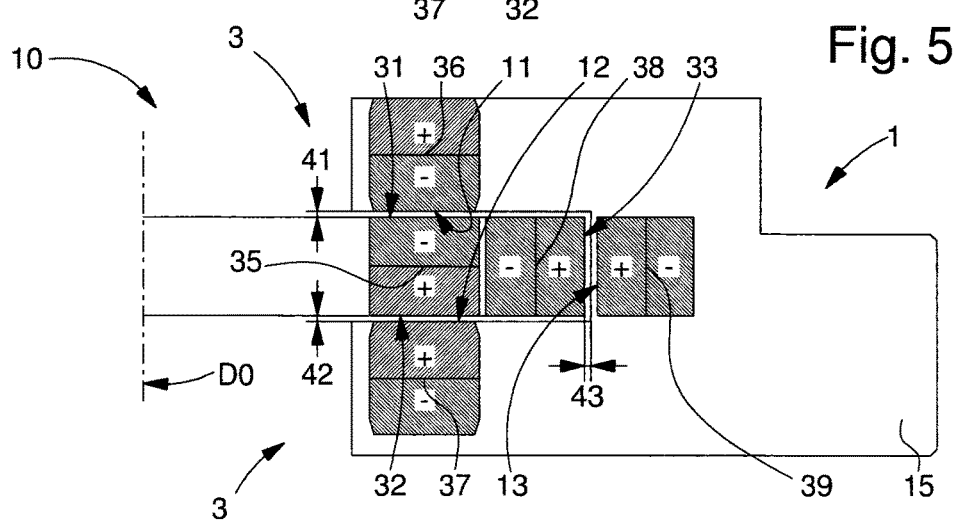
FIG. 5 illustrates a variant of FIG. 3, the mobile element including a peripheral path on a magnetically charged edge, repulsed by a fixed pole shoe located on the plane of the mobile element.
Figure 2:
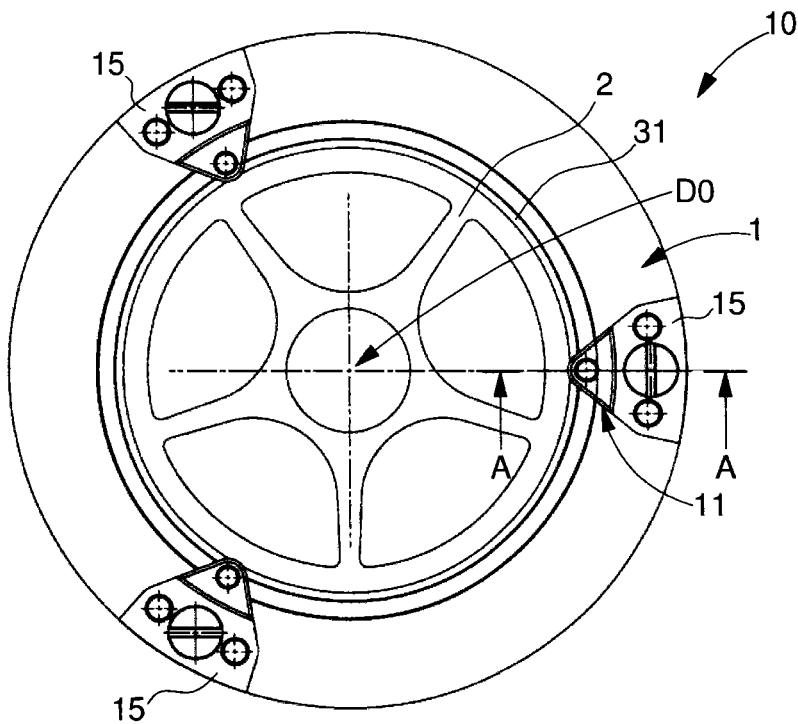
- FIG. 2 shows a schematic top view of the assembly of FIG. 1.

In order to ensure the proper centring of pivot axis D of mobile element 2 with respect to theoretical axis D0, and to ensure re-centring after a movement of the wearer (accelerations of approximately 20 g), and good resistance to shocks (which may reach an acceleration of 5000 g in a watch), mobile element 2 advantageously includes complementary centring means. In the variant of FIG. 5, these complementary centring means include a third peripheral edge surface 33, radially magnetically or electrically charged in a uniform manner in the angular coordinate, and device 1 includes at least three third magnetically or respectively electrically charged surfaces 13, all positioned opposite to this third peripheral edge surface 33, and regularly arranged around theoretical axis D0. This third edge surface 33 may form an integral part of mobile element 2, or of an added component such as a ring or similar.

FIG. 7 illustrates a variant providing improved security to prevent any radial drift of mobile element 2: each said first surface 11 and each second surface 12 includes means for emitting several magnetic or electrostatic fields in the same direction at the respective interface 41, 42. These fields are in substantially parallel directions to each other at the respective interface 41, 42. This series of fields includes at least:

a first inner field BE1 on an inner radius RI with respect to theoretical axis D0 which has a lower value than that of mean radius RM of the peripheral surface 31 or 32 opposite thereto;
  a second normal field BE2 on a normal radius RN of equal value to mean radius RM;
  and a third outer field BE3 on an outer radius RE of higher value than that of normal radius RN;
  the second normal field BE2 being of lower intensity than that of inner field BE1 and than that of outer field BE3, so as to return pivot axis D of mobile element 2 to conformity with theoretical axis D0 after any disturbance experienced by sub-assembly 10. None of the aforecited prior art documents disclose this particular arrangement of the magnetically or respectively electrically charged surfaces, or the arrangement of the fields that they emit and the distribution of such fields at the same interface.

Figure 8:
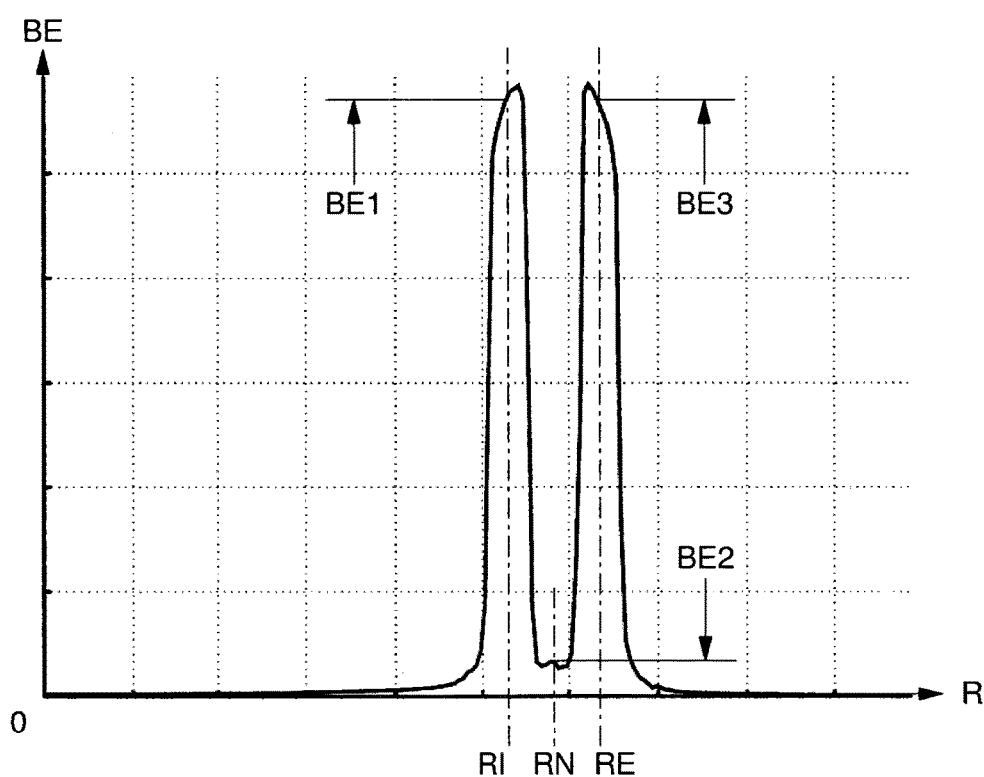
FIG. 8 illustrates this field distribution, with the radius from the pivot axis on the abscissa, and the field intensity on the ordinate.
Figure 12:
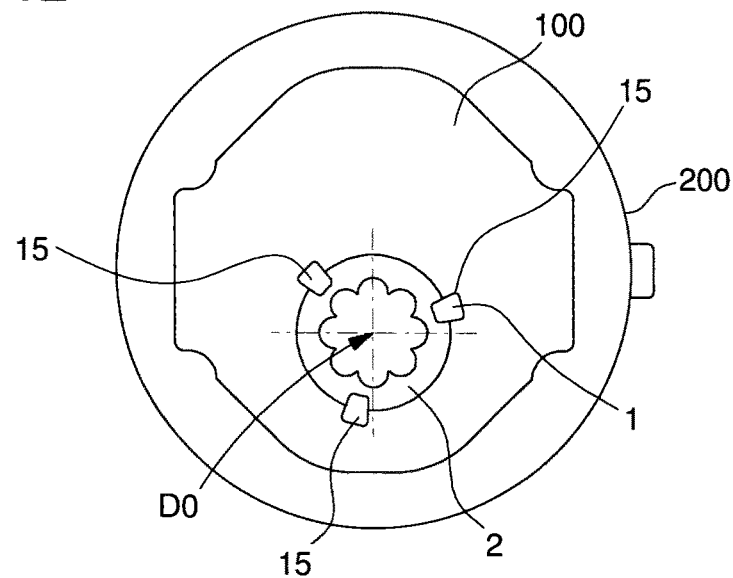
FIG. 12 shows a schematic top view of a watch equipped with an assembly according to the invention, with a mobile element having electrically charged surfaces, and a pivoting guide device with opposite electrically charged surfaces.

In such an application, in the example of FIG. 7, with a device 1 including three stations each equipped with 6 pole shoes, upper pole shoes 36A, 36B, 36C, and lower pole shoes 37A, 37B, 27C, in the case of magnetically charged pole shoes, there are therefore a total of 18 magnets for lifting mobile element 2 which are preferably all identical as regards their geometry, but wherein the magnets disposed on the intermediate radius are weaker (remanent field of 0.8 T) than the internal and external magnets (remanent field of 1.4 T). In this case, mobile element 2 experiences a strong repulsion causing it to move radially, because, by moving, it is much stronger opposite field than the field present in its position of equilibrium, as seen in FIG. 8. Thus, in this example:

in all positions (horizontal and vertical), mobile element 2 is maintained in levitation, with no contact with the stop members represented axially by surfaces 31, 32 and radially by carrier structure 15 comprised in device 1 for carrying the pole shoes which include these surfaces 31 and 32, and the vibrations resulting from the maintained movement are tiny and do not exceed two micrometers in the axial and radial direction;
  in all positions, mobile element 2 will resist an acceleration of between 15 g and 25 g in the direction of acceleration, before entering into contact with a stop member.

This example is not limiting, thus it is possible to use magnets with the same residual magnetism but with a different volume.

FIG. 9 illustrates a variant wherein, in the position of equilibrium, mobile element 2 is located between upper pole shoe 36 and lower pole shoe 37, offset radially in relation to each other and with respect to pole shoe 35 of mobile element 2, and this mobile element 2 is subjected to oblique counterbalancing fields, and wherein a radial drift produces a similar effect to return the first 31 and second 32 peripheral surfaces of mobile element 2 substantially to the middle of the gap between the inner radius RI and outer radius RE of the pole shoes of device 1, on normal radius RN.

FIG. 10 shows another variant with fewer pole shoes than in FIG. 7: the first peripheral surface 31, forming part of tilted upper pole shoes 36A and 36B, and the second peripheral surface 32, forming part of tilted lower pole shoes 37B and 37C, are conical with respect to pivot axis D at a cone angle θ. In combination, each first surface 11 and each second surface 12 has a normal in a plane passing through theoretical axis D0 and tilted at the same cone angle θ, in the same direction as the first peripheral surface 31 and respectively the second peripheral surface 32, in order to ensure substantially constant widths of interfaces 41, 42. In the event of a radial drift after an acceleration, the system tends to self-regulate and re-centring occurs automatically.

In another variant seen in FIG. 11, at the first interface 41, the magnetic or electrostatic field lines are tangential to a cylinder centred on theoretical axis D0 and obliquely incident at the same angle α with respect to a direction parallel to theoretical axis D0, and, at the second interface 42, the magnetic or electrostatic field lines are tangential to a cylinder centred on theoretical axis D0 and obliquely incident at the same angle β with respect to a direction parallel to theoretical axis D0.

It is also possible to improve the stability of the mobile element by varying the dimensions of surfaces 11 and 12, notably with a smaller inner diameter, and therefore with a greater surface area, which is possible since the invention does not require any axial pivots for mobile element 2.

FIG. 10 shows an alternative solution wherein the magnetized crown of the carriage is tilted at 30°: in this case the number of magnets can be reduced to 12; the magnets can also be replaced by one or more magnetized wafers, in a position tilted at 30°.

The height of commercial neodymium-iron-boron magnets can be reduced to 0.2 m, which allows production of very flat mobile elements 2.

Preferably, for implementation of the invention, the surfaces that are magnetized have a remanent field of more than 0.8 Tesla.

In the version using an electrostatic field, which is compatible with the small mass of mobile element 2 in the application to a watch, the surfaces that are electrically charged are preferably made with electrets. This version using at least one electrostatic field runs counter to the preconceived notions of those skilled in the art, who conventionally carefully avoid the presence of electrostatic fields in a watch case.

For good stabilization and good operation, the axial magnetization of the mobile element, or its electrical charge as appropriate, is preferably uniform, or substantially uniform, in the angular coordinate.

Advantageously, as a result of the invention, mobile element 2 can be made without any axial pivots.

In preferred and non-limiting embodiments, mobile element 2 is a tourbillon or karussel carriage, or a winding or striking barrel or a wheel.

In a static application, such as a clock 300, in a particular variant, mobile element 2 is subjected, at first peripheral surface 31, to a magnetic field which is generated by at least one electromagnet.

The invention also concerns a timepiece movement 100 including at least one such timepiece sub-assembly 10. According to an advantageous variant, this movement 100 includes magnetic and/or electrostatic field insulating or shielding means around mobile element 2 and pivoting guide device 1.

The invention also concerns a watch 200 including at least one such timepiece movement 100 and/or including at least one such timepiece sub-assembly 10. According to an advantageous variant, this watch 200 includes magnetic and/or electrostatic field insulating or shielding means around mobile element 2 and pivoting guide device 1.

The invention also concerns a clock 300 including at least one such timepiece movement 100 and/or including at least one such timepiece sub-assembly 10. According to an advantageous variant, this clock 300 includes magnetic and/or electrostatic field insulating or shielding means around mobile element 2 and pivoting guide device 1.

In summary, in an embodiment which presents no manufacturing difficulties, a tourbillon carriage includes a continuous outer ring, magnetized in the axial direction (for example + at Z+ and − at Z−). The main plate of movement 100 includes three magnets magnetized in the same manner and arranged at approximately 120° on a radius close to, but lower or higher than the ring of the tourbillon carriage. One, two or three bridges also carry three magnets in order to close the pivoting system. The three pairs of fixed magnets (main plates and bridges) maintain in axial and radial levitation the ring carrying the tourbillon carriage. This assembly ensures the position of the carriage and allows it to rotate without friction. This function is supplemented by a shock absorber function for the tourbillon carriage, which may remove the need for shock absorber systems arranged in the carriage.

It is also possible to house two magnetized rings in the main plate and the bridge of the movement, and three magnets in the carriage. This solution is slightly less advantageous in terms of space.

This peripheral or external guiding of the tourbillon carriage saves space as regards thickness by eliminating the two pivots usually at the centre of the mobile element.

The invention therefore provides friction-free pivoting with no variation in friction, which improves efficiency and operating stability.

A tourbillon carriage with guided pivoting according to the invention is subjected to permanent high frequency (on the order of 100 Hz) and low amplitude (on the order of a micrometer) oscillations as it pivots. These oscillations are insignificant as regards the proper operation of the mechanism.

By fulfilling the function of shock absorber, the device according to the invention also simplifies the pivoting of the balance arranged in the carriage and reduces the weight and number of components forming the tourbillon carriage.

The invention permits the production of ultra-flat tourbillons.

This pivoting of tourbillon carriages may advantageously be applied to other mobile timepiece elements, oscillating weights, drum barrels, or gear trains.

The invention claimed is:

1. A timepiece sub-assembly comprising:
   a mobile timepiece element including at least a first annular peripheral surface of revolution about a pivot axis of the mobile element; and
   a device for guiding pivoting about a theoretical axis of a timepiece mechanism;
   wherein the first peripheral surface is electrically charged; and
   the device further comprising a plurality of carrier structures positioned around a perimeter of the mobile timepiece element, each of the carrier structures including first electrically charged surfaces, positioned opposite to and above the first peripheral surface, to repulse the first peripheral surface at a first interface, to maintain the mobile element in axial levitation in a direction of the theoretical axis, the first electrically charged surfaces including a first upper pole shoe positioned radially closer to the theoretical axis than the first peripheral surface, a second upper pole shoe positioned a same distance from the theoretical axis as the first peripheral surface, and a third upper pole shoe positioned further from the theoretical axis than the first peripheral surface, and a magnetic field emitted at the second upper pole shoe being lower than a magnetic field emitted at the first upper pole shoe and lower than a magnetic field emitted at the third upper pole shoe.

2. The timepiece sub-assembly according to claim 1, wherein the first electrically charged surfaces of the plurality of carrier structures are regularly arranged around the theoretical axis in a perpendicular plane to the theoretical axis.

3. The timepiece sub-assembly according to claim 2, wherein the first electrically charged surfaces of each of the plurality of carrier structures are identical.

4. The timepiece sub-assembly according to claim 1, wherein the mobile timepiece element further includes a second annular peripheral surface of revolution about the pivot axis of the mobile element, and planar and parallel to the first annular peripheral surface of revolutions and opposite to each other on either side of the mobile element, and wherein the second peripheral surface is electrically charged, and
   wherein the device further comprises second electrically charged surfaces in each of the plurality of carrier structures and positioned opposite to and below the second peripheral surface to repulse the second peripheral surface, at a second interface, to maintain the mobile element in axial levitation in the direction of the theoretical axis, the second electrically charged surfaces including a first lower pole shoe positioned radially closer to the theoretical axis than the second peripheral surface, a second lower pole shoe positioned a same distance from the theoretical axis as the second peripheral surface, and a third lower pole shoe positioned further from the theoretical axis than the second peripheral surface, and a magnetic field emitted at the second lower pole shoe being lower than a magnetic field emitted at the first lower pole shoe and lower than a magnetic field emitted at the third lower pole shoe.

5. The timepiece sub-assembly according to claim 4, wherein the second electrically charged surfaces of the plurality of carrier structures are regularly arranged around the theoretical axis in a plane perpendicular to the theoretical axis.

6. The timepiece sub-assembly according to claim 4, wherein the first electrically charged surfaces are grouped together on a first ring along the theoretical axis, and/or wherein the second electrically charged surfaces are grouped together on a second ring along the theoretical axis.

7. The timepiece sub-assembly according to claim 4, wherein the first peripheral surface is separated from the second peripheral surface by a low dielectric, with a dielectric constant of between 1 and 50 and a dielectric rigidity of more than 10 MV/m, in a median groove comprised in the mobile element.

8. The timepiece sub-assembly according to claim 4, wherein the first peripheral surface is adjacent to the second peripheral surface, and wherein the surfaces are electrically charged with opposite polarity.

9. The timepiece sub-assembly according to claim 4, wherein, at the first interface, magnetic or electrostatic field lines generated between the first peripheral surface and the first electrically charged ring or the first electrically charged surfaces are tangential to a cylinder centered on the theoretical axis and obliquely incident at the same angle with respect to a direction parallel to the theoretical axis, and wherein, at the second interface, the magnetic or electrostatic field lines are tangential to a cylinder centered on the theoretical axis and obliquely incident at the same angle with respect to a direction parallel to the theoretical axis.

10. A watch comprising at least one timepiece sub-assembly according to claim 4, and magnetic and/or electrostatic field insulating or shielding means around the mobile element and the pivoting guide device.

11. A clock comprising at least one timepiece sub-assembly according to claim 4, and magnetic and/or electrostatic field insulating or shielding means around the mobile element and the pivoting guide device.

12. The timepiece sub-assembly according to claim 1, wherein the mobile element includes a third electrically charged peripheral edge surface, and wherein the device further comprises at least three third surfaces, all positioned opposite to the third peripheral edge surface to ensure centering of the mobile element, and regularly arranged around the theoretical axis.

13. The timepiece sub-assembly according to claim 1, wherein the surfaces that are electrically charged are made with electrets.

14. The timepiece sub-assembly according to claim 1, wherein the mobile element has no axial pivots.

15. The timepiece sub-assembly according to claim 1, wherein the mobile element is a wheel.

16. A timepiece movement comprising at least one timepiece sub-assembly according to claim 1, wherein the movement includes magnetic and/or electrostatic field insulating or shielding means around the mobile element and the pivoting guide device.

17. A timepiece sub-assembly comprising:
a mobile timepiece element including at least a first annular peripheral surface of revolution about a pivot axis of the mobile element; and
a device for guiding pivoting about a theoretical axis of a timepiece mechanism;
wherein the first peripheral surface is planar and magnetically or electrically charged; and
the device further comprising either a first magnetically or respectively electrically charged ring, or at least three first magnetically or respectively electrically charged surfaces, parallel to each other, positioned opposite to and above the first peripheral surface to repulse the first peripheral surface at a first interface, to maintain the mobile element in axial levitation in a direction of the theoretical axis,
wherein the one mobile timepiece element includes the second annular peripheral surfaces of revolution about the pivot axis of the mobile element which is parallel to and opposite to the first annular peripheral surface of revolution on either side of the mobile element,
wherein the second peripheral surface is magnetically or electrically charged, and
wherein the device further comprises either a second magnetically or respectively electrically charged ring, or at least three second magnetically or respectively electrically charged surfaces, parallel to each other, positioned opposite to and below the second peripheral surface to repulse the second peripheral surface, at a second interface, to maintain the mobile element in axial levitation in the direction of the theoretical axis, wherein the first peripheral surface and the second peripheral surface are tilted with respect to pivot axis such that an axis of the first peripheral surface and the second peripheral intersects the pivot axis at a cone angle to form a cone.

18. The timepiece sub-assembly according to claim 17, wherein each of the first electrically charged surfaces and each of the second electrically charged surfaces has a normal in a plane passing through the theoretical axis and tilted with respect to the pivot axis at a same cone angle, in a same direction as the first peripheral surface and respectively the second peripheral surface, to ensure substantially constant interface widths.

19. The timepiece sub-assembly according to claim 17, wherein the first peripheral surface is part of tilted upper pole shoes, and wherein the second peripheral surface is part of tilted lower pole shoes, and are conical and have a same direction of cone aperture that is tilted with respect to the pivot axis at the cone angle, and
wherein, in combination, each of the first electrically charged surfaces and each of the second electrically charged surfaces has a normal in a plane passing through the theoretical axis and tilted with respect to the pivot axis at the same cone angle, in a same direction as the first peripheral surface and respectively the second peripheral surface, to ensure substantially constant interface widths.

20. The timepiece sub-assembly according to claim 17, wherein the first peripheral surface is electrically charged, and wherein the device further comprises, either the first electrically charged ring, or at least three of the first electrically charged surfaces, and wherein the second peripheral surface is electrically charged, and wherein the device further comprises, either the second electrically charged ring, or at least three the second electrically charged surfaces.

21. The timepiece sub-assembly according to claim 17, wherein the surfaces that are magnetically charged have a remanent field of more than 0.8 Tesla.

22. The timepiece sub-assembly according to claim 17, wherein the mobile element is subjected, at the first peripheral surface, to a magnetic field which is generated by at least one electromagnet.

23. The timepiece sub-assembly according to claim 17, wherein the first peripheral surface and the second peripheral surface are tilted by 30° with respect to the pivot axis.

* * * * *